(12) United States Patent
Hayashi

(10) Patent No.: US 11,613,643 B2
(45) Date of Patent: Mar. 28, 2023

(54) ANTIGLARE FILM

(71) Applicant: DAICEL CORPORATION, Osaka (JP)

(72) Inventor: Masaki Hayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 642 days.

(21) Appl. No.: 16/610,667

(22) PCT Filed: Jun. 25, 2018

(86) PCT No.: PCT/JP2018/023939
§ 371 (c)(1),
(2) Date: Nov. 4, 2019

(87) PCT Pub. No.: WO2019/026467
PCT Pub. Date: Feb. 7, 2019

(65) Prior Publication Data
US 2021/0141129 A1 May 13, 2021

(30) Foreign Application Priority Data
Aug. 4, 2017 (JP) ............................. JP2017-151495

(51) Int. Cl.
G02B 5/02 (2006.01)
C08L 33/08 (2006.01)
C08J 7/04 (2020.01)

(52) U.S. Cl.
CPC .............. C08L 33/08 (2013.01); C08J 7/0427 (2020.01); G02B 5/0242 (2013.01); G02B 5/0268 (2013.01); C08J 2333/08 (2013.01); C08J 2433/08 (2013.01)

(58) Field of Classification Search
CPC .......................................... G02B 5/02–5/0294
See application file for complete search history.

(56) References Cited

U.S. PATENT DOCUMENTS

| | | | | |
|---|---|---|---|---|
| 8,917,452 B2 * | 12/2014 | Ohashi | ................. | G02B 5/0221 |
| | | | | 359/601 |
| 2002/0012086 A1 | 1/2002 | Uchida et al. | | |
| 2004/0196558 A1 | 10/2004 | Takahashi et al. | | |
| 2007/0298193 A1 * | 12/2007 | Nakamura | ............ | G02B 5/0278 |
| | | | | 427/163.4 |
| 2009/0002831 A1 * | 1/2009 | Mikami | ................... | G02B 1/111 |
| | | | | 359/599 |
| 2009/0268299 A1 | 10/2009 | Furui et al. | | |
| 2014/0254020 A1 | 9/2014 | Sakajiri et al. | | |
| 2017/0022343 A1 | 1/2017 | Sakakibara et al. | | |
| 2017/0052288 A1 * | 2/2017 | Ludemann | ......... | G02B 27/0025 |

FOREIGN PATENT DOCUMENTS

| | | |
|---|---|---|
| JP | 2004-126495 A | 4/2004 |
| JP | 3559505 A | 5/2004 |
| JP | 2004-306328 A | 11/2004 |
| JP | 2006-106290 A | 4/2006 |
| JP | 2006-113561 A | 4/2006 |
| JP | 2006-154791 A | 6/2006 |
| JP | 2008-152268 A | 7/2008 |
| JP | 2009157234 A * | 7/2009 |
| JP | 2009-175041 A | 8/2009 |
| JP | 2013-47821 A | 3/2013 |
| JP | 2014-38362 A | 2/2014 |
| JP | 2014-85371 A | 5/2014 |
| JP | 2015-132744 A | 7/2015 |
| JP | 2015-172835 A | 10/2015 |
| JP | 2015-172837 A | 10/2015 |
| JP | 2015-196347 A | 11/2015 |
| JP | 2016/50950 A | 4/2016 |
| JP | 2016-157386 A | 9/2016 |
| JP | 2016-170779 A | 9/2016 |
| KR | 11-2011-0124376 A | 11/2011 |
| KR | 11-2013-0114276 A | 10/2013 |
| WO | WO 2006/106757 A1 | 10/2006 |
| WO | WO 2015/145618 A1 | 10/2015 |

OTHER PUBLICATIONS

Machine translation of JP2009157234. Retrieved Aug. 25, 2021.*
Machine translation of JP 2014-006448. Retrieved Oct. 6, 2022.*
JIS Determination for magnitude of display sparkle JIS C 1006:201 (2019).
Notice of Revocation dated Dec. 6, 2021, in Japanese Patent No. 6719677.
"Film Sparkle Analyzer apparatuses for evaluating glare-proof film," [on line], Jul. 21, 2016, Daicel Corporation and Dai Co., Ltd. Cell Homepage [Search Mar. 8, 2021], Internet <URL:https://www.daicel.com/business/new-solution/high-performance-film/pdf/features01.pdf>.
"Galaxy S4," URL://https/www.gsmarena.comsamsung_i9500_galaxy_s4-5125.php (2013).
Office Action dated Apr. 12, 2021, in Japanese Patent Application No. 2019-533963.
Ohashi et al., "Fundamental study of cylindrical blasting," Journal of the Japan Society for Abrasive Technology (2012), vol. 56, No. 9, pp. 626-631.
International Preliminary Report on Patentability and Written Opinion dated Feb. 13, 2020, in PCT/JP2018/023939 (Forms PCT/IB/326, PCT/IB/373, and PCT/ISA/237).
International Search Report dated Sep. 18, 2018, in PCT/JP2018/023939.

* cited by examiner

Primary Examiner — Prashant J Khatri
(74) Attorney, Agent, or Firm — Birch, Stewart, Kolasch & Birch, LLP

(57) ABSTRACT

The antiglare film of the present invention is provided with an antiglare layer having a haze value set in a range from 0.5% to 20%, transmission image clarity at an optical comb width of 0.5 mm is a value in a range from 60% to 96%, and, in a state where the antiglare film is mounted on a surface of a display, a standard deviation of luminance distribution of the display is a value in a range from 0 to 12.

4 Claims, 2 Drawing Sheets

ANTIGLARE FILM

TECHNICAL FIELD

The present invention relates to an antiglare film that prevents reflection of external light from being cast onto a surface of a display.

BACKGROUND ART

An antiglare film is, for example, a film having an antiglare layer including recesses and protrusions formed on a surface thereof by surface roughening, and such a film is attached to a surface of a display to scatter external light and prevent reflection of the external light from being cast onto the surface of the display.

Examples of methods for forming recesses and protrusions on the surface of an antiglare layer include a method of dispersing microparticles (fillers) in an antiglare layer as disclosed in Patent Document 1, a method of using a phase separation structure formed by spinodal decomposition from a liquid phase of a plurality of polymers as disclosed in Patent Document 2, and a method of transfer-molding a concave-convex shape using a mold as disclosed in Patent Document 3.

CITATION LIST

Patent Document

Patent Document 1: JP 2009-109702 A
Patent Document 2: JP 3559505 B
Patent Document 3: JP 2014-102356 A

SUMMARY OF INVENTION

Technical Problem

When an antiglare film is mounted to the surface of a display, reflection of external light onto the surface of the display is prevented, but light from the display is affected by the antiglare film, hence image blurring and changes in color tones occur on the display, and performance of display through the antiglare film on the display may be impaired.

In addition, when an antiglare film is mounted on a surface of a display or the like having high definition pixels, light from the display that passes through the antiglare film is refracted by the recesses and protrusions of the surface of the antiglare layer, and pixels of the display may look expanded due to a lens effect from the recesses and protrusions of the surface of the antiglare layer, whereby sparkle may be generated on the display, and the image may become difficult to see.

As a method for suppressing the sparkle of a display, it is conceivable, for example, to reduce the size of recesses and protrusions of the surface of the antiglare layer, but there is a risk that the antiglare property of the antiglare film could decrease. Also, the sparkle of a display is difficult to quantitatively evaluate, and it may be difficult to develop, in accordance with an objective index, an antiglare film that can effectively suppress the sparkle of the display.

Therefore, an object of the present invention is to provide an antiglare film that can suppress sparkle of a display while having favorable antiglare property, and can prevent display performance from lowering on the display, by quantitatively evaluating and designing the sparkle of the display.

Solution to Problem

In order to solve the above problems, an antiglare film according to one aspect of the present invention is provided with an antiglare layer having a haze value set in a range from 0.5% to 20%, transmission image clarity at an optical comb width of 0.5 mm is a value in a range from 60% to 96%, and, in a state where the antiglare film is mounted on a surface of a display, a standard deviation of luminance distribution of the display is a value in a range from 0 to 12.

Here, the value of the standard deviation of the luminance distribution of the display indicates a degree of variation of brightness on the display and is an objective indicator that can be used to quantitatively evaluate the sparkle of a display. Therefore, with the configuration described above, the sparkle of the display can be quantitatively evaluated and an antiglare film can be designed by configuring the antiglare film such that the standard deviation is set to a value in a range from 0 to 12. Accordingly, the antiglare film, which can effectively suppress the sparkle of a display, can be stably obtained in comparison with, for example, a case in which a tester visually and subjectively evaluates the sparkle of the display.

In addition, by configuring the antiglare film by setting the transmission image clarity to a value in a range from 60% to 96%, light from the display can be prevented from being affected by the antiglare film. Thus, by mounting the antiglare film on the display, the display performance of the display can be prevented from being lowered.

Additionally, by setting the haze value of the antiglare layer to a value in a range from 0.5% to 20% while setting the value of the standard deviation to a predetermined value, appropriate recesses and protrusions can be formed on the surface of the antiglare layer. As a result, occurrence of sparkle on a display, on which the antiglare film is mounted, can be suppressed, and favorable antiglare property can be obtained.

The antiglare layer may include a plurality of resin components and may have a co-continuous phase structure formed by phase separation of the plurality of resin components. With such a co-continuous phase structure, appropriate recesses and protrusions can be formed while suppressing the haze value on the surface of the antiglare layer, thereby making it easier to suppress display sparkle and obtain antiglare property.

The antiglare layer may include a matrix resin and a plurality of microparticles dispersed in the matrix resin, and a refractive index difference between the microparticles and the matrix resin may be a value in a range from 0 to 0.20.

According to the abovementioned configuration, an increase in the internal haze value of the antiglare layer due to the microparticles can be suppressed and a reduction in the transmission image clarity of the antiglare film can be suppressed by setting the refractive index difference between the matrix resin and the microparticles to a predetermined range in the antiglare layer and dispersing the plurality of microparticles in the matrix resin.

A ratio G2/G1 of a weight G1 of the matrix resin of the antiglare layer to a total weight G2 of the plurality of microparticles included in the antiglare layer may be a value in a range from 0.02 to 0.15. Through this, the antiglare film having an antiglare layer of a structure, in which a plurality of microparticles are dispersed in a matrix resin, can be favorably manufactured.

Advantageous Effects of Invention

According to the present invention, an antiglare film can be provided which can suppress sparkle of a display while having favorable antiglare property, and can prevent display performance from lowering on the display, by quantitatively evaluating and designing the sparkle of a display.

DESCRIPTION OF EMBODIMENTS

Embodiments of the present invention are described below with reference to the drawings.

First Embodiment

Figure 1:
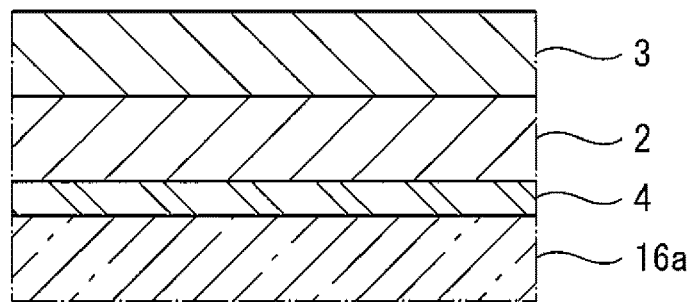
FIG. 1 is a cross-sectional view illustrating a configuration of an antiglare film according to a first embodiment.

FIG. 1 is a cross-sectional view illustrating a configuration of an antiglare film 1 according to a first embodiment. The antiglare film 1 is mounted on a surface of a display 16a of a display device 16 (see FIG. 3). The antiglare film 1 is provided with a substrate film 2, an antiglare layer 3, and an adhesive layer 4.

The substrate film 2 is disposed between the display 16a and the antiglare layer 3, and supports the antiglare layer 3. The adhesive layer 4 is disposed between the display 16a and the substrate film 2, and fixes the antiglare film 1 to the surface of the display 16a. The adhesive layer 4 is, for example, an optical glue, and is configured from a material that is unlikely to affect optical properties of the antiglare film 1.

The antiglare layer 3 is formed on at least one surface of the substrate film 2. The antiglare layer 3 imparts antiglare property to the antiglare film 1, and prevents reflection of external light from being cast onto the surface of the display 16a by scattering and reflecting the external light. The antiglare layer 3 functions also as a hard coat (HC) layer that protects the surface of the display 16a. As an example, the antiglare layer 3 includes a plurality of phase-separable resin components.

With the antiglare film 1, the transmission image clarity (image clarity) at an optical comb width of 0.5 mm is set to a value in a range from 60% to 96%, and the standard deviation of luminance distribution of the display 16a when the antiglare film 1 is mounted on a surface of the display 16a is set to a value in a range from 0 to 12.

Transmission image clarity is a scale that quantifies the blurriness and distortion of light transmitted through the antiglare film 1, and can be measured by a measurement method conforming to JIS K7105. The haze value of the antiglare layer 3 is set to a value in a range from 0.5% to 20%. The haze value indicated in the present embodiment is a value measured by a method conforming to JIS K7136.

In addition, the value of the transmission image clarity (image clarity) at an optical comb width of 0.5 mm of the antiglare film 1 can be appropriately set within the range described above, but is more preferably a value in a range from 70% to 96%, and still more preferably a value in a range from 80% to 96%. Furthermore, the value of the standard deviation of the antiglare film 1 can be appropriately set within the range described above, but is more preferably a value in a range from 0 to 10, and still more preferably a value in a range from 0 to less than 9.

Moreover, the haze value of the antiglare layer 3 can be appropriately set within the range described above, but is preferably a value in a range from 1% to 20%, more preferably a value in a range from 2% to 20%, and still more preferably a value in a range from 4% to 20%.

Thus, in the present embodiment, the value of the standard deviation of the luminance distribution of the display 16a indicates a degree of variation in brightness on the display 16a, and is an objective indicator that can be used to quantitatively evaluate the sparkle of the display 16a. On the basis thereof, the sparkle of the display 16a can be quantitatively evaluated to design the antiglare film 1 by configuring the antiglare film 1 such that the standard deviation is set to a value in a range from 0 to 12.

Accordingly, the antiglare film 1, which can effectively suppress the sparkle of the display 16a, can be stably obtained in comparison with, for example, a case in which a tester visually and subjectively evaluates the sparkle of the display 16a.

Additionally, by setting the haze value of the antiglare layer 3 to a value in a range from 0.5% to 20% while setting the value of the standard deviation of the antiglare film 1 to a predetermined value, appropriate recesses and protrusions can be formed on the surface of the antiglare layer 3. As a result, occurrence of sparkle on the display 16a, on which the antiglare film 1 is mounted, can be suppressed, and favorable antiglare property can be obtained.

In addition, light from the display 16a can be suppressed from being affected by the antiglare film 1, by setting the transmission image clarity of the antiglare film 1 to a value in a range from 60% to 96%. Thus, by mounting the antiglare film 1 to the display 16a, the display performance of the display 16a can be prevented from being lowered.

In addition, the antiglare layer 3 of the present embodiment includes a plurality of resin components, and has a co-continuous phase structure formed by phase separation of the plurality of resin components. With such a co-continuous phase structure, appropriate recesses and protrusions can be formed while suppressing the haze value on the surface of the antiglare layer 3, thereby making it easier to suppress sparkle of the display 16a and obtain antiglare property. Specific examples of the substrate film 2 and the antiglare layer 3 are described below.

Examples of materials of the substrate film 2 include glass, ceramic, and resin. As the resin, a resin similar to the material of the antiglare layer 3 can be used. Preferred materials of the substrate film 2 include transparent polymers, such as, for example, cellulose derivatives (such as cellulose triacetate (TAC), cellulose diacetate, and other such cellulose acetates), polyester resins (such as polyethylene terephthalate (PET), polyethylene naphthalate (PEN), polybutylene terephthalate (PBT), and polyarylate-based resins), polysulfone resins (such as polysulfone and polyethersulfone (PES)), polyether ketone based resins (such as polyetherketone (PEK) and polyether ether ketone (PEEK)), polycarbonate-based resins (PC), polyolefin-based resins (such as polyethylene and polypropylene), cyclic polyolefin-based resins (such as "ARTON" (registered trademark) film available from JSR Corporation and "ZEONEX" (registered trademark) film available from Zeon Corporation), halogen-containing resins (such as polyvinylidene chloride), (meth) acrylic resins, styrene-based resins (such as polystyrene), and vinyl acetate or vinyl alcohol-based resins (such as polyvinyl alcohol).

The substrate film 2 may be uniaxially or biaxially stretched, but is preferably optically isotropic and has a low refractive index. Examples of the optically isotropic substrate film 2 include unstretched films.

The thickness dimension of the substrate film 2 can be appropriately set, but for example, is desirably a value in a range from 5 μm to 2000 μm, more desirably a value in a range from 15 μm to 1000 μm, and still more desirably a value in a range from 20 μm to 500 μm.

Structure of Antiglare Layer

The antiglare layer 3 of the first embodiment has a phase separation structure of a plurality of resin components. As an example, the antiglare layer 3 has on the surface thereof a plurality of long, narrow (string-like or linear) protrusions formed by the phase separation structure of a plurality of resin components. The long, narrow protrusions are branched and form a co-continuous phase structure in a dense state.

The antiglare layer 3 manifests antiglare property by the plurality of long, narrow protrusions and recesses located between adjacent long, narrow protrusions. By providing the antiglare layer 3 like this, the antiglare film 1 has excellent balance between the haze value and transmission image clarity (image clarity). The long, narrow protrusions are formed in a roughly net-like shape, whereby the surface of the antiglare layer 3 has a net-like structure, or in other words, a plurality of irregular loop structures that are continuous or partially missing.

With the formation of the abovementioned structure at the surface of the antiglare layer 3, the formation of protrusions in a lens shape (sea-island shape) is prevented. Thus, the refraction of light, passing through the antiglare layer 3 from the display 16a, by the recesses and protrusions of the surface of the antiglare layer 3, and expanded appearance of pixels of the display 16a due to a lens effect from the recesses and protrusions of the surface of the antiglare layer 3 are prevented, and the sparkle of the display 16a is suppressed. As a result, even when the antiglare film 1 is mounted on the display 16a having high definition pixels, the sparkle of the display 16a can be suppressed at a high degree while ensuring antiglare property, and text and image blurring and/or changes in color tones can be suppressed.

Note that the plurality of long, narrow protrusions may be mutually independent or may be connected. As described below, the phase separation structure of the antiglare layer 3 is formed by spinodal decomposition (wet spinodal decomposition) from the liquid phase using a solution that is a raw material of the antiglare layer 3. For details of the antiglare layer 3, reference can be made to the description in JP 2012-231496, for example.

Material of Antiglare Layer

It is sufficient that the plurality of resin components included in the antiglare layer 3 be phase-separable, but from the perspective of obtaining an antiglare layer 3 on which long, narrow protrusions are formed and which has high scratch resistance, the plurality of resin components preferably include a polymer and a curable resin.

Examples of the polymer contained in the antiglare layer 3 include thermoplastic resins. Examples of the thermoplastic resins include styrene-based resins, (meth)acrylate polymers, organic acid vinyl ester resins, vinyl ester resins, halogen-containing resins, olefin-based resins (including alicyclic olefin-based resins), polycarbonate resins, polyester resins, polyamide resins, thermoplastic polyurethane resins, polysulfone-based resins (such as polyether sulfone and polysulfone), polyphenylene ether-based resins (such as a polymer of 2,6-xylenol), cellulose derivatives (such as cellulose esters, cellulose carbamates, and cellulose ethers), silicone resins (such as polydimethylsiloxane and polymethylphenylsiloxane), and rubbers or elastomers (such as, polybutadiene, polyisoprene, and other diene-based rubbers, styrene-butadiene copolymers, acrylonitrile-butadiene copolymers, acrylic rubber, urethane rubber, and silicone rubber). These thermoplastic resins can be used alone or in a combination of two or more.

Examples of the polymer include polymers having a functional group that participates in a curing reaction, or polymers having a functional group that reacts with a curable compound. The polymer may have a functional group in the main chain or side chain.

Examples of the functional group include condensable groups, reactive groups (for example, a hydroxyl group, an acid anhydride group, a carboxyl group, an amino group or an imino group, an epoxy group, a glycidyl group, or an isocyanate group), and polymerizable groups (for example, $C_{2-6}$ alkenyl groups such as vinyl, propenyl, isopropenyl, butenyl, and allyl groups, $C_{2-6}$ alkynyl group such as ethynyl, propynyl, and butynyl groups, $C_{2-6}$ alkenylidene groups such as a vinylidene group, or a group (such as a (meth)acryloyl group) having a polymerizable group thereof). Of these functional groups, a polymerizable group is preferable.

Furthermore, the antiglare layer 3 may include a plurality of types of polymers. Each of these polymers may be phase separable by spinodal decomposition from the liquid phase, and may be mutually immiscible. The combination of a first polymer and a second polymer included in the plurality of types of polymers is not particularly limited, and polymers which are mutually immiscible near a processing temperature can be used.

For example, when the first polymer is a styrene-based resin (such as polystyrene or a styrene-acrylonitrile copolymer), the second polymer may be, for example, a cellulose derivative (for example, a cellulose ester such as cellulose acetate propionate), a (meth) acrylic resin (such as polymethyl methacrylate), an alicyclic olefin resin (such as a polymer containing norbornene as a monomer), a polycarbonate-based resin, or a polyester-based resin (such as a poly $C_{2-4}$ alkylene arylate-based copolyester).

Also, for example, when the first polymer is a cellulose derivative (for example, a cellulose ester such as cellulose acetate propionate), the second polymer may be, for example, a styrene-based resin (such as polystyrene or a styrene-acrylonitrile copolymer), a (meth) acrylic resin, an alicyclic olefin resin (such as a polymer containing norbornene as a monomer), a polycarbonate-based resin, or a polyester-based resin (such as a poly $C_{2-4}$ alkylene arylate-based copolyesters).

The plurality of types of polymers may include at least a cellulose ester (for example, a cellulose $C_{2-4}$ alkyl carboxylate such as cellulose diacetate, cellulose triacetate, cellulose acetate propionate, or cellulose acetate butyrate).

Here, when manufacturing the antiglare layer 3, the phase separation structure of the antiglare layer 3 is fixed by curing of a precursor of the curable resin contained in the plurality of resin components by, for example, activate energy rays (such as ultraviolet light or electron beams) or heat. Additionally, scratch resistance and durability are imparted to the antiglare layer 3 by such a curable resin.

From the perspective of obtaining scratch resistance of the antiglare layer 3, at least one polymer included in the plurality of types of polymers is preferably a polymer having, in a side chain, a functional group that can react with a curable resin precursor. The polymer that forms the phase separation structure may include a thermoplastic resin or other polymer in addition to the two mutually immiscible polymers described above. A weight ratio M1/M2 of a weight M1 of the first polymer to a weight M2 of the second polymer, and the glass transition temperature of the polymers can be set as appropriate.

Examples of the curable resin precursor include curable compounds having a functional group that undergoes a reaction by heat or active energy rays (such as ultraviolet light or electron beams) for example, and undergoes curing or crosslinking through this functional group thereby forming a resin (in particular, a cured or crosslinked resin).

Examples of such a compound include a thermosetting compound or a thermosetting resin (a low molecular weight compound (such as for example, an epoxy resin, an unsaturated polyester resin, a urethane resin, and a silicone resin) having, for example, an epoxy group, a polymerizable group, an isocyanate group, an alkoxysilyl group, or a silanol group), and a photocurable (ionizing radiation curable) compound that can be cured by ultraviolet light, electron beams or the like (such as photocurable monomers, oligomers and other such UV curable compounds).

Examples of preferable curable resin precursors include photocurable compounds that are cured in a short period of time by, for example, ultraviolet light or electron beams. Of these, UV curable compounds are particularly practical. In addition, to improve resistance such as scratch resistance, the photocurable compound preferably has 2 or more (preferably from 2 to 15, and more preferably from 4 to 10) polymerizable unsaturated bonds per molecule. Specifically, the photocurable compound is preferably epoxy (meth) acrylate, urethane (meth) acrylate, polyester (meth) acrylate, silicone (meth) acrylate, or a multifunctional monomer having at least two polymerizable unsaturated bonds.

The curable resin precursor may include, according to the type thereof, a curing agent. For example, the thermosetting resin precursor may include a curing agent such as amines and polyvalent carboxylic acids, and the photocurable resin precursor may include a photopolymerization initiator. Examples of the photopolymerization initiator include commonly used components such as acetophenones or propiophenones, benzyls, benzoins, benzophenones, thioxanthones, and acylphosphine oxides.

Furthermore, the curable resin precursor may include a curing accelerator. For example, the photocurable resin precursor may include a photocuring accelerator, for example, a tertiary amine (such as dialkylaminobenzoate), and a phosphine-based photopolymerization accelerator.

In a manufacturing process of the antiglare layer 3, at least two components of the curable resin precursor and the polymer contained in the solution that serves as the raw material of the antiglare layer 3 are used as a combination that implements mutual phase separation near the processing temperature. Examples of the combination that implements phase separation include (a) a combination in which a plurality of types of polymers are immiscible and phase separate; (b) a combination in which a polymer and a curable resin precursor are immiscible and phase separate, or (c) a combination in which a plurality of curable resin precursors themselves are immiscible and phase separate. Of these combinations, ordinarily the combination (a) of a plurality of types of polymers, and the combination (b) of a polymer and a curable resin precursor are used, and the combination of (a) a plurality of types of polymers is preferable.

Typically, the refractive index of the polymer and the refractive index of the cured resin or crosslinked resin produced by curing the curable resin precursor mutually differ. Moreover, typically, the refractive indexes of the plurality of types of polymers (the first polymer and the second polymer) also mutually differ. A difference between the refractive index of the polymer and refractive index of the cured resin or crosslinked resin, and the difference between the refractive indexes of the plurality of types of polymers (the first polymer and the second polymer) are, for example, preferably a value in a range from 0 to 0.04, and more preferably a value in a range from 0 to 0.02.

The antiglare layer 3 may include a plurality of microparticles (fillers) dispersed in a matrix resin. The microparticles may be organic microparticles and/or inorganic microparticles, and the plurality of microparticles may include a plurality of types of microparticles.

Examples of the organic microparticles include crosslinked acrylic particles and crosslinked styrene particles. Examples of the inorganic microparticles include silica particles and alumina particles. In addition, the refractive index difference between the microparticles and the matrix resin included in the antiglare layer 3 can be set to a value in a range from 0 to 0.20, as an example. This refractive index difference is more desirably a value in a range from 0 to 0.15, and still more preferably a value in a range from 0 to 0.07.

An average particle size of the microparticles is not particularly limited, and for example, can be set to a value in a range from 0.5 µm to 5.0 µm. The average particle size is more preferably a value in a range from 0.5 µm to 3.0 µm, and still more preferably a value in a range from 0.5 µm to 2.0 µm.

Note that the average particle size referred to here is the 50% volume average particle size with regards to the Coulter counter method (the same applies to the average particle size referred to below). The microparticles may be solid or hollow. It should be noted that if the average particle size of the microparticles is too small, antiglare property will be difficult to achieve, and if the average particle size is too large, the sparkle of the display could be large.

The thickness dimension of the antiglare layer 3 can be set as appropriate, but is, for example, preferably a value in a range from 0.3 µm to 20 µm, more preferably a value in a range from 1 µm to 15 µm, and still more preferably a value in a range from 1 µm to 10 µm. Ordinarily, the thickness dimension is set to a value in a range of from 2 µm to 10 µm (in particular, a value in a range from 3 µm to 7 µm).

Note that the antiglare film can also be configured without the substrate film 2, but in this case, the thickness dimension of the antiglare layer 3 is preferably a value in a range from 1 µm to 100 µm, and more preferably a value in a range from 3 µm to 50 µm.

The antiglare layer 3 may contain commonly used additives within a range that does not impair the optical properties, and examples thereof include organic or inorganic particles, a stabilizer (such as an antioxidant and a UV absorbers), surfactants, water-soluble polymers, fillers, crosslinking agents, coupling agents, colorants, flame retardants, lubricants, waxes, preservatives, viscosity modifiers, thickeners, leveling agents, and antifoaming agents.

The method of manufacturing the antiglare film 1 according to the first embodiment includes: by way of example, a preparation step of preparing a solution that serves as a raw material of the antiglare layer 3 (hereinafter, also simply referred to as a "solution"); a formation step of coating a surface of a predetermined support (the substrate film 2 in the present embodiment) with the solution prepared in the preparation step, evaporating the solvent in the solution, and forming a phase separation structure by spinodal decomposition from the liquid phase; and a curing step of curing the curable resin precursor after the formation step.

Preparation Step

In the preparation step, a solution containing a solvent and a resin composition for configuring the antiglare layer 3 is prepared. The solvent can be selected according to the type and solubility of the curable resin precursor and polymer contained in the above-described antiglare layer 3. The solvent is preferably a solvent that can uniformly dissolve at least solid content (the plurality of types of polymers and the curable resin precursor, a reaction initiator, and other additives).

Examples of the solvent include ketones (such as acetone, methyl ethyl ketone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), halogenated carbons (such as dichloromethane and dichloroethane), esters (such as methyl acetate, ethyl acetate, and butyl acetate), water, alcohols (such as ethanol, isopropanol, butanol, and cyclohexanol), cellosolves (such as methyl cellosolve and ethyl cellosolve), cellosolve acetates, sulfoxides (such as dimethyl sulfoxide), and amides (such as dimethylformamide and dimethylacetamide). In addition, the solvent may be a mixed solvent.

A composition containing the thermoplastic resin, a photocurable compound, a photopolymerization initiator, the thermoplastic resin, and a photocurable compound is desirable as the resin composition. Alternatively, a composition containing the plurality of types of mutually immiscible polymers, a photocurable compound, and a photopolymerization initiator is desirable as the resin composition.

The concentration of a solute (polymer and curable resin precursor, reaction initiator, and other additives) in the solution can be adjusted in a range in which phase separation of the plurality of resin components occurs, and in which the flow extensibility, coating properties and such of the solution are not impaired.

Here, the haze value and internal haze value of the antiglare layer 3, the transmission image clarity of the antiglare film 1, and the value (sparkle value) of the standard deviation of the luminance distribution of the display 16a having the antiglare film 1 mounted on the surface thereof may vary depending on factors such as the combination of the resin composition in the solution, the weight ratio, or execution conditions of the preparation step, formation step, and curing step. Therefore, an antiglare film having targeted physical properties can be obtained by changing each of the conditions to form the antiglare layer, and measuring and ascertaining in advance the physical properties of the obtained antiglare layer.

Formation Step

In the formation step, the solution prepared in the preparation step is cast onto the surface of the support (here, as an example, the substrate film 2) to be coated thereon. Examples of a method for casting or a method for coating with the solution include commonly used methods using, for instance, spraying, a spinner, a roll coater, an air knife coater, a blade coater, a rod coater, a reverse coater, a bar coater, a comma coater, dipping, a dip squeeze coater, a die coater, a gravure coater, a micro gravure coater, and a silk screen coater.

The solvent is evaporated and removed by drying from the solution cast or coated onto the surface of the support. Phase separation through spinodal decomposition from the liquid phase of the plurality of resin components occurs in association with concentration of the solution in this evaporation process, and a phase separation structure with a relatively regular interphase distance (pitch or mesh diameter) is formed. The co-continuous phase structure of the long, narrow protrusions can be formed by setting formulation and drying conditions such that the melt flowability of the resin component after solvent evaporation becomes relatively high.

From the perspective of easily forming the long, narrow protrusions on the surface of the antiglare layer 3, the solvent is preferably evaporated by heating and drying. Note that in a case where the drying temperature is too low or the drying time is too short, an amount of heat that is imparted to the resin component will be insufficient, and the melt flowability of the resin component may be reduced, which may make it difficult to form long, narrow protrusions.

On the other hand, in a case where the drying temperature is too high or the drying time is too long, once formed, the long, narrow protrusions may flow, leading to a decrease in height, but the structure of the long, narrow protrusions is maintained. Therefore, the drying temperature and drying time can be used as means for adjusting antiglare property and slipperiness of the antiglare layer 3 by changing the height of the long, narrow protrusions. Furthermore, in the formation step, a co-continuous phase structure, in which the phase separation structure is connected, can be formed by increasing the evaporation temperature of the solvent or using a component having a low viscosity for the resin component.

When the co-continuous phase structure is formed and roughening occurs in association with the progression of phase separation due to spinodal decomposition from the liquid phase of the plurality of resin components, the continuous phase becomes discontinuous, and a droplet phase structure (sea-island structure of an independent phase having a shape such as spherical, perfectly spherical, disc-like, or ellipsoidal) is formed. Here, depending on the degree of phase separation, an intermediate structure between the co-continuous phase structure and the droplet phase structure (that is, a phase structure in a process of transitioning from the co-continuous phase to the droplet phase) can also be formed. After the solvent has been removed, a layer with fine recesses and protrusions is formed on the surface.

By forming fine recesses and protrusions on the layer surface by phase separation in this manner, the haze value of the antiglare layer 3 can be adjusted even without dispersing microparticles in the antiglare layer 3. In addition, since the microparticles need not be dispersed in the antiglare layer 3, the haze value of the antiglare layer 3 can be easily adjusted while suppressing the internal haze value in comparison with the external haze value. Note that the antiglare layer 3 containing microparticles can be formed by adding a certain amount of microparticles to the solution in the preparation step.

Curing Step

In the curing step, the curable resin precursor in the solution is cured, whereby the phase separation structure formed in the formation step is fixed and the antiglare layer 3 is formed. Curing of the curable resin precursor is performed by heating or irradiation with an active energy ray, or by a combination of these methods, depending on the type of curable resin precursor. The active energy ray to be irradiated is selected according to the type of photocurable components or the like.

The irradiation with an active energy ray may be performed in an inert gas atmosphere. When the active energy ray is ultraviolet light, examples of light sources that can be used include a far-ultraviolet light lamp, a low-pressure mercury lamp, a high-pressure mercury lamp, an ultrahighpressure mercury lamp, a halogen lamp, and a laser light source (light source such as a helium-cadmium laser and an excimer laser).

Note that when forming the adhesive layer 4, after a solution containing an adhesive component is prepared, the adhesive layer 4 can be formed by coating another surface of the substrate film 2 with the solution and then drying the coated surface by a commonly used method such as for example, the casting method or the coating method described above in the formation step.

By implementing each of the above steps, the antiglare film 1 of the first embodiment is produced. Note that when a support having releasability is used as the support, the antiglare layer 3 is peeled from the support, whereby an antiglare film constituted only of the antiglare layer 3 can be obtained. Furthermore, when a non-releasable support (preferably a transparent support such as the substrate film 2) is used as the support, the antiglare film 1 having a laminated structure of the support (substrate film 2) and the antiglare layer 3 can be obtained.

Here, as a method for suppressing the sparkle of the display 16a, it is conceivable, for example, to reduce the recesses and protrusions of the surface of the antiglare layer, but the antiglare property of the antiglare film may decrease. However, in addition to this, antiglare property can be improved while suppressing the sparkle of the display and suppressing the haze value to within a predetermined range by adjusting the number of recesses and protrusions and the degree of recess and protrusion steepness deriving from the height of inclination of the recesses and protrusions of the antiglare layer.

Such recesses and protrusions can be formed in the antiglare layer by the spinodal decomposition described above in the first embodiment, but such recesses and protrusions can also be formed in the antiglare layer by other methods. For example, even when a plurality of microparticles are used to form the recesses and protrusions in the surface of the antiglare layer as in a second embodiment, suitable aggregation of the microparticles can be caused by selecting a material such that the repulsive interaction between the microparticles and other resins and solvents is strong when forming the antiglare layer, whereby a distributed structure of recesses and protrusions, for which the steepness and number density have been adjusted, can be formed in the antiglare layer. Hereinafter, the antiglare layer of other embodiments will be described focusing on differences from the first embodiment.

Second Embodiment

The antiglare layer of the antiglare film according to a second embodiment includes a matrix resin and a plurality of microparticles dispersed in the matrix resin. The microparticles are formed in a perfectly spherical shape, but the shape of the microparticles is not limited thereto, and may be formed in a substantially spherical or ellipsoidal shape. In addition, the microparticles are formed in a solid form, but may also be formed so as to be hollow. When the microparticles are hollow, the hollow part of the microparticles may be filled with air or another gas. In the antiglare layer, each type of microparticles may be dispersed as a primary particle, or a plurality of secondary particles, formed by aggregating a plurality of microparticles, may be dispersed.

The refractive index difference between the matrix resin and the microparticles can be set to a value in a range from 0 to 0.20. This refractive index difference is more preferably a value in a range from 0 to 0.15, and still more preferably a value in a range from 0 to 0.07.

The microparticles have an average particle size that is set to a value in a range from 0.5 μm to 5.0 μm. The average particle size of the microparticles is more preferably a value in a range from 0.5 μm to 3.0 μm, and still more preferably a value in a range from 0.5 μm to 2.0 μm.

In addition, variation in particle size of the microparticles is preferably small, and for example, in the particle size distribution of the microparticles contained in the antiglare layer, a 50 wt. % or greater average particle size of microparticles included in the antiglare layer is preferably confined to a variation within 1.0 μm.

In this manner, uniform and moderate recesses and protrusions are formed in the surface of the antiglare layer by microparticles having a relatively uniform particle size and an average particle size, which is within the aforementioned range. As a result, the sparkle of the display 16a can be suppressed while ensuring antiglare property.

A ratio between the weight of the matrix resin and the total weight of the plurality of microparticles in the antiglare layer can be set as appropriate. In the present embodiment, a ratio $G2/G1$ of the weight $G1$ of the matrix resin of the antiglare layer to the total weight $G2$ of the plurality of microparticles included in the antiglare layer is set to a value in a range from 0.02 to 0.15. The ratio $G2/G1$ is preferably a value in a range from 0.02 to 0.13, and more preferably a value in a range from 0.02 to 0.10.

The microparticles dispersed in the matrix resin may be either inorganic or organic, but preferably have favorable transparency. Examples of the organic microparticles include plastic beads. Examples of the plastic beads include styrene beads (refractive index of 1.59), melamine beads (refractive index of 1.57), acrylic beads (refractive index of 1.49), acrylic-styrene beads (refractive index of 1.54), polycarbonate beads, and polyethylene beads. The styrene beads may be cross-linked styrene beads, and the acrylic beads may be cross-linked acrylic beads. The plastic beads desirably have on the surface thereof a hydrophobic group. Examples of such plastic beads include styrene beads.

Examples of the matrix resin include at least any of a photocurable resin that is cured by an active energy ray, a solvent-drying resin that cures through drying of a solvent added during coating, and a thermosetting resin.

Examples of photocurable resins include those having an acrylate-based functional group, such as, for example, relatively low molecular weight polyester resins, polyether resins, acrylic resins, epoxy resins, urethane resins, alkyd resins, spiroacetal resins, polybutadiene resins, polythiol polyene resins; oligomers such as (meth) acrylates of polyfunctional compounds such as polyhydric alcohols; prepolymers; and reactive diluents.

Specific examples of these include monofunctional monomers such as ethyl (meth) acrylate, ethylhexyl (meth) acrylate, styrene, methyl styrene, and N-vinylpyrrolidone, as well as multifunctional monomers such as, for example, polymethylol propane tri(meth) acrylate, hexanediol (meth) acrylate, tripropylene glycol di(meth) acrylate, diethylene glycol di(meth) acrylate, pentaerythritol tri(meth) acrylate, dipentaerythritol hexa(meth) acrylate, 1,6-hexanediol di(meth) acrylate, and neopentyl glycol di(meth) acrylate.

When the photocurable resin is a UV curable resin, use of a photopolymerization initiator is preferable. Examples of photopolymerization initiators include acetophenones, benzophenones, Michler's benzoyl benzoate, α-amyloxime ester, tetramethylthiuram monosulfide, and thioxanthones. Furthermore, a photosensitizer is preferably mixed with the photocurable resin for use. Examples of the photosensitizer include n-butylamine, triethylamine, and poly-n-butylphosphine.

Examples of the solvent-drying resin include known thermoplastic resins. Examples of the thermoplastic resin include styrene-based resins, (meth) acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The solvent-drying resin is preferably a resin that is soluble in an organic solvent and, in particular, is preferably a resin that excels in moldability, film formability, transparency, and weather resistance. Examples of such a solvent-drying resin include styrene-based resins, (meth) acrylic resins, alicyclic olefin resins, polyester resins, and cellulose derivatives (such as cellulose esters).

Here, when the material of the substrate film 2 is a cellulosic resin such as triacetyl cellulose (TAC), a cellulosic resin can be exemplified as a thermoplastic resin used in a solvent-drying resin. Examples of this cellulosic resin include cellulose derivatives such as nitrocellulose, acetyl cellulose, acetylbutyl cellulose, ethyl cellulose, methyl cellulose, cellulose acetate propionate, and ethyl hydroxyethyl cellulose. By using a cellulosic resin as a solvent-drying resin, the substrate film 2 and the antiglare layer 3 can be tightly joined with favorable adherence, and the antiglare film 1 having excellent transparency can be obtained.

Furthermore, other examples of the solvent-drying resin include vinyl resins, acetal resins, acrylic resins, polystyrene resins, polyamide resins, and polycarbonate resins.

Examples of thermosetting resins include phenolic resins, urea resins, diallyl phthalate resins, melamine resins, guanamine resins, unsaturated polyester resins, polyurethane resins, epoxy resins, amino alkyd resins, melamine-urea co-condensed resins, silicon resins, and polysiloxane resins. When a thermosetting resin is used as the matrix resin, at least one of a crosslinking agent, a polymerization initiator or other such curing agent, a polymerization accelerator, a solvent, and a viscosity adjusting agent may be used in combination.

A method of manufacturing an antiglare film according to the second embodiment includes, by way of example, a preparation step of preparing a solution that serves as a raw material of the antiglare layer 3, a coating step of coating a surface of a predetermined support (the substrate film 2 in the present embodiment) with the solution prepared in the preparation step, and a curing step of curing the resin in the coated solution.

Preparation Step

In the preparation step, a solution containing a solvent, a resin composition for configuring the antiglare layer, and microparticles is prepared. Examples of the solvent include at least any of alcohols (such as isopropyl alcohol, methanol, and ethanol), ketones (such as methyl ethyl ketone (MEK), methyl isobutyl ketone (MIBK), and cyclohexanone), esters (such as methyl acetate, ethyl acetate, and butyl acetate), halogenated hydrocarbons, and aromatic hydrocarbons (such as toluene and xylene). A known leveling agent may be further added to the solution. Excellent scratch resistance can be imparted to the antiglare layer by using, for example, a fluorine-based or silicone-based leveling agent.

Coating and Curing Step

In the coating step, the solution prepared in the preparation step is cast onto the surface of the support (here, as an example, the substrate film 2) by a method similar to that of the first embodiment to be or coated thereon. The solvent is evaporated and removed by drying from the solution that was cast or coated onto the surface of the support.

In a case where the matrix resin is a photocurable resin, a curing step of curing by, for example, ultraviolet light or electron beams, is performed after the coating step. Examples of the ultraviolet light source include light sources of various types of mercury lamps, ultraviolet carbon arc lamps, black lights, and metal halide lamps. The wavelength range of the ultraviolet light can be, for example, a wavelength range from 190 nm to 380 nm.

Examples of the electron beam source include known electron beam accelerators. Specific examples include various electron beam accelerators such as a Van de Graaff accelerator, a Cockcroft-Walton accelerator, a resonant transformer type accelerator, an insulating core transformer type accelerator, a linear accelerator, a Dynamitron type accelerator, and a high frequency type accelerator.

The positions of the microparticles in the matrix resin is fixed by curing the matrix resin contained in the solution. As a result, a plurality of microparticles are dispersed in the matrix resin, and an antiglare layer having a structure, in which recesses and protrusions are formed by microparticles in the surface is formed.

According to the antiglare film of the second embodiment, an increase in the internal haze value of the antiglare layer due to the microparticles can be suppressed, and a reduction in the transmission image clarity of the antiglare film can be suppressed by setting the refractive index difference between the matrix resin and the microparticles to a predetermined range in the antiglare layer and dispersing the plurality of microparticles in the matrix resin.

In addition, since the ratio G2/G1 is set to a value in a range from 0.02 to 0.15, an antiglare film having an antiglare layer with a structure, in which a plurality of microparticles is dispersed in the matrix resin, can be favorably manufactured.

Third Embodiment

An antiglare layer 33 of an antiglare film according to a third embodiment has a structure in which a concave-convex shape is formed on a surface on a side opposite the substrate film side. The antiglare layer 33 is constituted of a resin layer. As an example, this resin layer is configured from a material similar to that of the matrix resin of the second embodiment.

Figure 2:
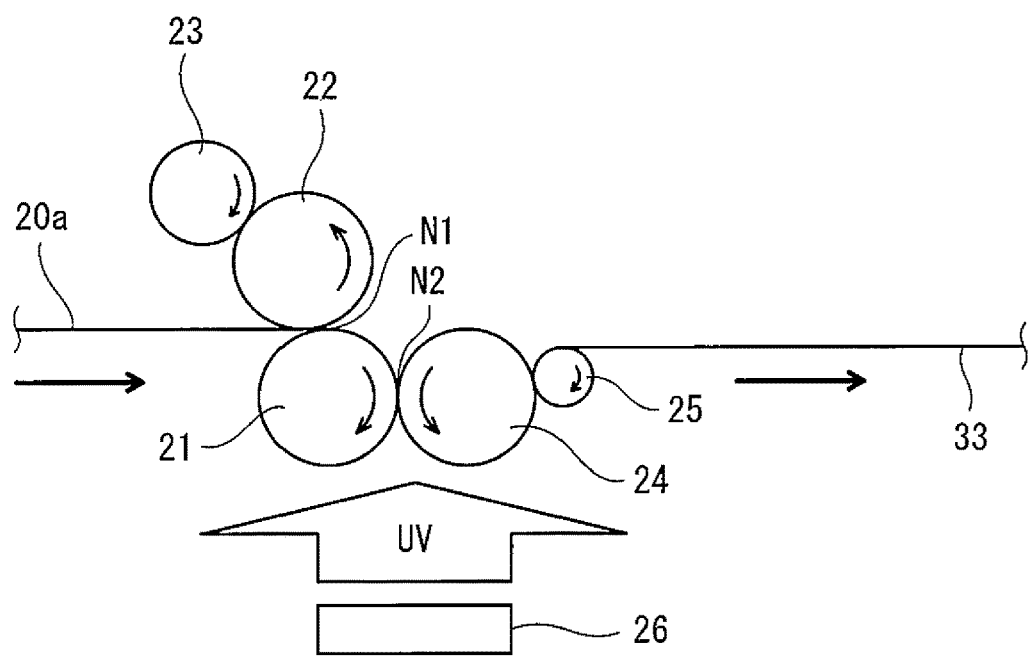
FIG. 2 is a diagram illustrating a method of manufacturing the antiglare film according to a third embodiment.

Specifically, the antiglare film according to the third embodiment is manufactured by forming, on a substrate film, a coating layer that includes a curable resin, followed by shaping a surface of the coating layer into a concave-convex shape, and then curing the coating layer. FIG. 2 is a diagram illustrating a method of manufacturing the antiglare film according to the third embodiment. In the example of FIG. 2, a UV curable resin is used as the curable resin.

As illustrated in FIG. 2, in this manufacturing method, a substrate film 20a is unwound from an unwinding roll (not illustrated) and conveyed in a predetermined direction. A downstream end portion of the substrate film 20a in the conveyance direction is inserted through a nip point N1 between a pair of rolls 21, 22.

A UV curable resin precursor is adhered to a circumferential surface of the roll 22 from a circumferential surface of a roll 23 that is axially supported adjacent to the roll 22. As the substrate film 20a passes through the nip point N1, the UV curable resin precursor is coated onto one surface of the substrate film 20a.

The layer (hereinafter, referred to as a coating layer) of the UV curable resin precursor coated onto the substrate film 20*a* is pressed together with the substrate film 20*a* at the nip point between the rolls 21, 24. The roll 24 is a roll-shaped mold (embossing roll) having fine recesses and protrusions formed on the circumferential surface, and transfers the concave-convex shape to the surface of the coating layer as the film passes through the nip point N2 between the rolls 21, 24.

The coating layer having the concave-convex shape transferred to the surface by the roll 24 is cured by ultraviolet light irradiated from an ultraviolet lamp 26 provided below the rolls 21, 24. As a result, the antiglare layer 33 is formed. The antiglare film 33 produced in this manner is released from the roll 24 by a roll 25 that is axially supported adjacent to the roll 24, and is conveyed in a predetermined direction.

Here, the recesses and protrusions on the surface of the roll 24 are formed by striking the surface thereof with blast particles of a predetermined particle size through a blasting method, and the concave-convex shape formed in the coating layer of the antiglare film 33 can be adjusted by adjusting the blast particle size.

As the substrate film 20*a*, a PET (polyethylene terephthalate) film, a TAC (triacetyl cellulose) film, a COP (cycloolefin polymer) film, an acrylic resin film, or a polycarbonate resin film can be preferably used.

Thus, the method of fabricating the antiglare film according to the third embodiment includes a step (a) of coating a substrate film with a curable resin precursor, a step (b) of striking the surface of a roll with blast particles to fabricate a roll-shaped mold having a concave-convex shape on the surface, a step (c) of using this roll-shaped mold to transfer the concave-convex shape to the surface of the curable resin precursor coated onto the substrate film, and a step (d) of curing the curable resin precursor to which the concave-convex shape was transferred, thereby forming an antiglare layer having a concave-convex shape on the surface.

An average particle size of the blast particles used in step (b) can be set as appropriate, and as an example, can be set to a value in a range from 10 μm to 50 μm. The average particle size of the blast particles is preferably a value in a range from 20 μm to 45 μm, is more preferably a value in a range from 30 μm to 40 μm. As a result, an antiglare layer 33 having a concave-convex shape formed on the surface is obtained.

Note that a mold used in the third embodiment may be a type other than a roll type mold, and for example, may be a plate-like mold (embossing plate). Furthermore, after the coating layer (resin layer) is formed on one surface of the substrate film, the surface of the coating layer may be shaped by the mold, and the coating layer may be cured thereby forming the antiglare layer 33. Furthermore, in the example described above, the coating layer was cured after shaping the surface of the coating layer, but the shaping and curing of the coating layer may be performed simultaneously.

The material of the mold can be, for example, metal, plastic, or wood. A coating may be provided on a contact surface of the mold that contacts the coating layer for durability (wear resistance) improvement of the mold. The material of blast particles can be, for example, metal, silica, alumina, or glass. The blast particles can strike the surface of the mold by pressure of a gas or liquid for example. In addition, when the curable resin precursor is an electron beam curing type, an electron beam source, such as an electron beam accelerator, can be used in place of the ultraviolet lamp 26, and when the curable resin precursor is heat curable, a heating source, such as a heater, can be used in place of the ultraviolet lamp 26.

Note that the antiglare layer of the antiglare film according to the embodiments described above may further have an upper layer disposed on a surface on a side opposite the substrate film 2 side. By providing this upper layer, the external haze of the antiglare layer can be easily adjusted, and the antiglare film can be easily protected from the outside.

A thickness of the upper layer can be set as appropriate, and for example, can be set to a Value in a range from 0.5 μm to 20 μm. The thickness of the upper layer is more preferably a value in a range from 2.0 μm to 12 μm, and still more preferably a value in a range from 3.0 μm to 8.0 μm.

A sparkle measurement apparatus and a sparkle evaluation method for inspecting and evaluating the antiglare film of the embodiments described above are described, in order, below.

Sparkle Measurement Apparatus

Figure 3:
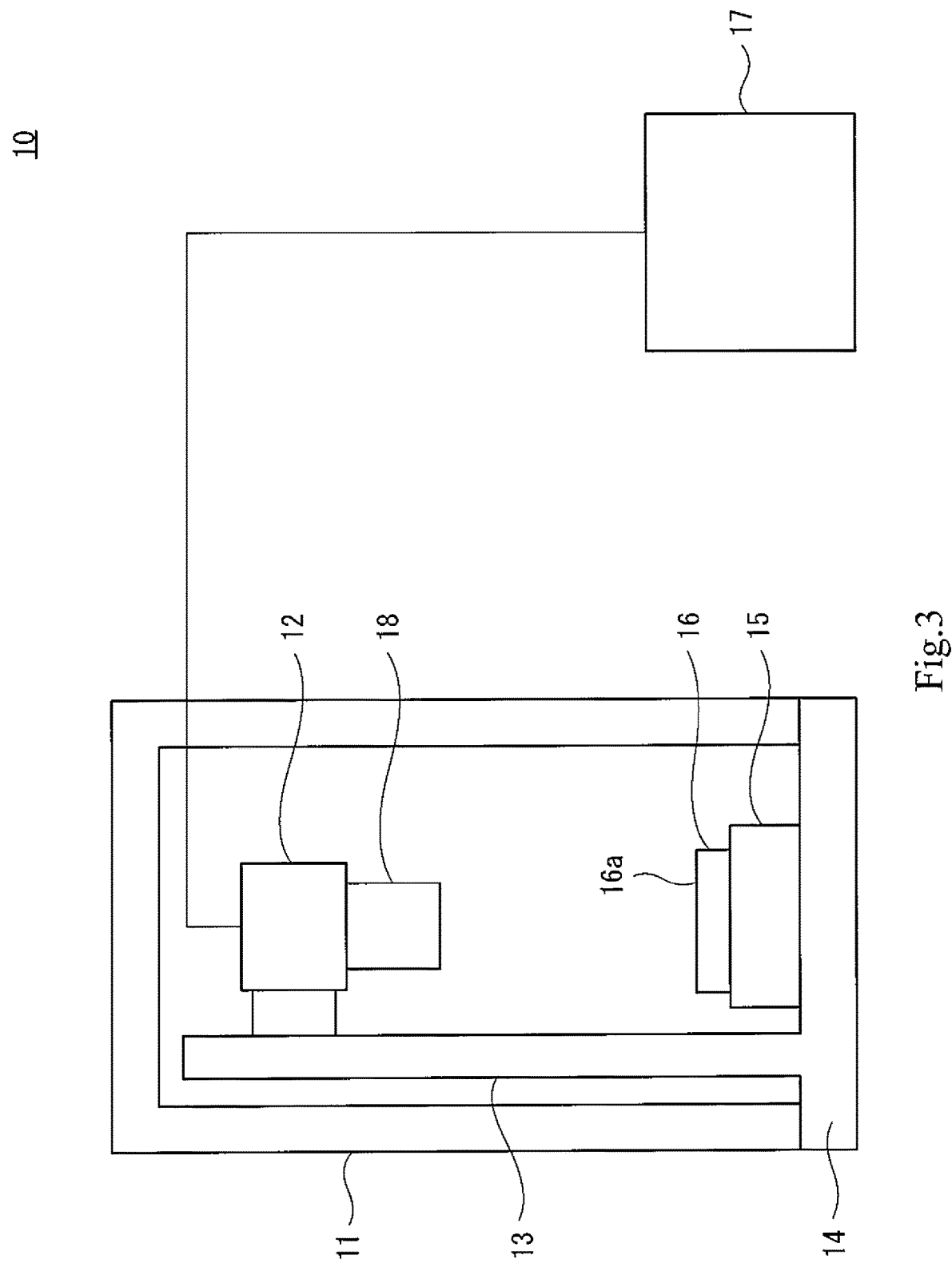
FIG. 3 is a schematic view of a sparkle measurement apparatus.

FIG. 3 is a schematic view of a sparkle measurement apparatus 10. The sparkle measurement apparatus 10 is a device for evaluating the sparkle of the display 16*a* of a display device 16 to which a film such as an antiglare film 1 is mounted on a surface, and the sparkle measurement apparatus 10 is provided with: an enclosure 11, an imaging device 12, a holding unit 13, an imaging device frame 14, a display device frame 15, and an image processing device 17. An example of a commercially available sparkle measurement apparatus 10 is a Film Sparkle Measurement apparatus available from Komatsu NTC Ltd.

The enclosure 11 has a dark room for capturing an image of the display 16*a* by the imaging device 12. The enclosure 11 accommodates the imaging device 12, the holding unit 13, the imaging-device frame 14, the display-device frame 15, and a display device 16 of an evaluation target.

The imaging device 12 is an area camera having, as examples, a lens 18 and an imaging element, and captures an image to be displayed on the display 16*a*. The imaging device 12 is connected to an image processing device 17, and is held by the holding unit 13 such that the lens 18 and the display 16*a* face each other. Image data captured by the imaging device 12 is transmitted to the image processing device 17.

The holding unit 13 extends in the vertical direction and holds the imaging device 12 while being fixed to the imaging-device frame 14 at the lower end. The holding unit 13 holds the imaging device 12 such that a relative distance between the display 16*a* and the lens 18 can be changed by moving the imaging device 12 relative to the display device 16 in the vertical direction.

The display device 16 is mounted on a top surface of the display-device frame 15 in a state where the display 16*a*, on which the film is mounted, faces the imaging device 12. The display-device frame 15 supports the display 16*a*, on which the film is mounted, such that the surface of the display 16*a* faces the imaging device 12 and serves as a horizontal surface, and relatively moves the display device 16 with respect to the imaging device 12 in the vertical direction.

With the sparkle measurement apparatus 10, a pixel size of an image displayed on the display 16*a* is adjusted by adjusting a relative distance between the imaging device 12 and the display 16*a*, with the image being captured per unit pixel (for example, one pixel) of the imaging element of the imaging device 12.

The image processing device 17 performs data processing of image data captured by the imaging device 12. Specifically, the image processing device 17 determines a standard deviation of luminance of the display 16a from the image data captured by the imaging device 12.

The image processing device 17 of the present embodiment is provided with: an input unit into which image data captured by the image capturing device 12 is input, an image processing unit that performs image processing on the input image data, and an output unit that outputs to a display device, a printing device, or the like, a result processed by the image processing unit.

As the method for adjusting the pixel size of an image to be captured per unit pixel (for example, one pixel) of the imaging element when an image displayed on the display 16a is captured by the imaging device 12, in addition to the method of changing the relative distance between the imaging device 12 and the display 16a, in a case where the lens 18 included in the imaging device 12 is a zoom lens, a method of changing a focal length of the imaging device 12 may be employed.

Sparkle Evaluation Method

Next, a method of evaluating sparkle of the display 16a using the sparkle measurement apparatus 10 is described. In this sparkle evaluation method, for convenience of evaluation, the display 16a, on which the film is mounted on the surface thereof, is displayed, in advance, illuminated uniformly in a single color (green as an example).

Next, an adjusting step is performed to adjust the pixel size of the display 16a on which the film is mounted, the pixel size being a size to be imaged per unit pixel of the imaging element of the imaging device 12. In the adjusting step, the relative distance between the imaging device 12 and the display 16a on which the film is mounted is adjusted, according to the number of effective pixels of the imaging element of the imaging device 12, to an extent that, in the image captured by the imaging device 12, there is no emission line due to the pixels or there is no impact on the evaluation of the sparkle of the display 16a even if there is an emission line due to the pixels.

Note that the relative distance between the imaging device 12 and the display device 16 is preferably set by taking into account usage conditions of the display device 16 (for example, the relative distance between user's eyes and the surface of the display 16a).

After the adjustment step is performed, a setting step is performed in which a measurement area for evaluating the sparkle of the display 16a, on which the film is mounted, is set. In the setting step, the measurement area is appropriately set according to, for example, the size of the display 16a.

After the adjusting step has been performed, an imaging step is performed in which the measurement area of the display 16a, on which the film is mounted, is imaged by the imaging device 12. At this time, as an example, at least one of exposure time of the imaging device 12 and luminance of all of the pixels of the display 16a is adjusted whereby image data as a gray scale image with an 8-bit gradation display and an average luminance of 170 gradations is obtained. The image data captured in the imaging step is input into the image processing device 17.

After the imaging step, the image processing device 17 performs a calculation step to determine, by using image data, luminance variation in the measurement area of the display 16a on which the film is mounted. In this calculation step, the luminance variation is quantified as a standard deviation of luminance distribution.

Here, the sparkle of the display 16a, on which the film is mounted, increases as the luminance variation of the display 16a, on which the film is mounted, becomes greater. Thus, as the value of the standard deviation of the luminance distribution becomes smaller, the sparkle of the display 16a can be quantitatively evaluated as being smaller. In addition, in the adjusting step, the emission line of the display 16a, on which the film is mounted, is adjusted to an extent that does not affect the evaluation of the sparkle of the display 16a, and therefore luminance unevenness due to an emission line can be suppressed, and the sparkle of the display 16a can be accurately evaluated. By implementing each of the steps described above, the standard deviation of the luminance distribution of the display 16a, on which the film is mounted, can be determined, and the sparkle of the display 16a can be evaluated by the value.

Examples and Comparative Examples

Hereinafter, the present invention is described in greater detail based on examples, but the present invention is not limited to these examples. In each of Examples 1 and 2, an antiglare layer 3 is formed using a phase separation structure as a basic structure. In each of Examples 3 and 4, a plurality of low refractive index beads (acrylic beads) are dispersed in the matrix resin to form the antiglare layer 3. In Comparative Example 1, a plurality of high refractive index beads (polystyrene particles) are dispersed in the matrix resin to form an antiglare layer having an increased haze value. In each of Example 5 and Comparative Examples 2 to 5, an antiglare layer is formed by forming recesses and protrusions by embossing on the surface of a transparent resin coated onto a substrate film. Note that the refractive indexes described in the following examples and comparative examples indicate refractive indexes after crosslinking (after curing) with regard to a product cured by crosslinking.

Raw Material

Materials below were used as raw materials used in the examples and comparative examples.

Acrylic polymer A having a polymerizable group: "Cyclomer P" available from Daicel-Allnex Ltd., refractive index of 1.51

Cellulose acetate propionate: "CAP-482-20" available from Eastman Chemical Company, degree of acetylation=2.5%, degree of propionylation=46%, number average molecular weight of 75000 in terms of polystyrene, refractive index of 1.49

Silicone acrylate: "EB1360" available from Daicel-Allnex Ltd., refractive index of 1.52

Dipentaerythritol hexaacrylate: "DPHA" available from Daicel-Allnex Ltd., refractive index of 1.52

Acrylic hard coat formulation A: "FA-3155 Clear" available from Nippon Kako Toryo Co., Ltd., containing acrylic microparticles (refractive index of 1.50) and a matrix resin (refractive index of 1.46)

Acrylic hard coat formulation B: "FA-3155M" available from Nippon Kako Toryo Co., Ltd., refractive index of 1.46

Photoinitiator A: "Irgacure 184" available from BASF Japan Ltd.

Polyethylene terephthalate (PET) film: "Diafoil" available from Mitsubishi Plastics, Inc.

Cellulose triacetate (TAC) film: "Fujitac TG60UL" available from Fujifilm Corporation Example 1

A solution was prepared by dissolving 5.7 parts by weight of the acrylic polymer A having a polymerizable group, 1.2 parts by weight of the cellulose acetate propionate, 4 parts by weight of the dipentaerythritol hexaacrylate, 2.77 parts by weight of the silicone acrylate, and 0.5 parts by weight of the photoinitiator A in a mixed solvent of 25 parts by weight of methyl ethyl ketone and 12.2 parts by weight of 1-butanol.

This solution was flow-casted onto a PET film (substrate film 2) using a wire bar (#24), and then left in an oven at 80° C. for 1 minute to evaporate the solvent, and a coating layer having a thickness of about 7 μm was formed. The coating layer was irradiated for approximately 5 seconds with ultraviolet light using a high-pressure mercury lamp, whereby the coating layer was UV cured. As a result, an antiglare layer 3 was formed, and the antiglare film of Example 1 was obtained.

Example 2

A solution was prepared by dissolving 4.1 parts by weight of the acrylic polymer A having a polymerizable group, 1.2 parts by weight of the cellulose acetate propionate, 4 parts by weight of the dipentaerythritol hexaacrylate, 2.77 parts by weight of the silicone acrylate, and 0.5 parts by weight of the photoinitiator A in a mixed solvent of 25 parts by weight of methyl ethyl ketone and 12.2 parts by weight of 1-butanol.

This solution was flow-casted onto a PET film (substrate film 2) using a wire bar (#22), and then left in an oven at 100° C. for 1 minute to evaporate the solvent, and a coating layer having a thickness of about 6 μm was formed. The coating layer was irradiated for approximately 5 seconds with ultraviolet light using a high-pressure mercury lamp, whereby the coating layer was UV cured. As a result, an antiglare layer 3 was formed, and the antiglare film of Example 2 was obtained.

Example 3

A solution was prepared by mixing 63 parts by weight of the acrylic hard coat formulation A and 37 parts by weight of the acrylic hard coat formulation B. This solution was flow-casted onto a TAC film (substrate film 2) using a wire bar (#10), and then left in an oven at 100° C. for 1 minute to evaporate the solvent, and a coating layer having a thickness of about 6 μm was formed. The coating layer was irradiated for approximately 5 seconds with ultraviolet light using a high-pressure mercury lamp, whereby the coating layer was UV cured. As a result, the antiglare layer 3 was formed, and the antiglare film of Example 3 was obtained.

Example 4

A solution was prepared by mixing 32 parts by weight of the acrylic hard coat formulation A and 68 parts by weight of the acrylic hard coat formulation B. This solution was flow-casted onto a TAC film (substrate film 2) using a wire bar (#10), and then left in an oven at 100° C. for 1 minute to evaporate the solvent, and a coating layer having a thickness of about 6 μm was formed. The coating layer was irradiated for approximately 5 seconds with ultraviolet light using a high-pressure mercury lamp, whereby the coating layer was UV cured. As a result, the antiglare layer 3 was formed, and the antiglare film of Example 4 was obtained.

Comparative Example 1

Triacetyl cellulose (available from Fujifilm Corp., thickness of 80 μm) was prepared as a substrate film. Pentaerythritol triacrylate (PE-3A, available from Kyoeisha Chemical Co., Ltd., refractive index of 1.53) was used as a transparent resin, and this transparent resin was made to contain, as light transmitting particles, 26 parts by weight of silica particles (SS50F; available from Tosoh Silica Corporation, refractive index of 1.47, average particle size of 1.1 μm) and 6.6 parts by weight of polystyrene particles (refractive index of 1.59, average particle size of 3.5 μm) per 100 parts by weight of the transparent resin. A resin composition obtained by blending therewith 5.3 parts by weight of Irgacure 184 (available from BASF) as a photopolymerization initiator and 138 parts by weight of toluene (boiling point of 110° C.) as a solvent was coated onto the substrate film, and the coated substrate film was dried for 1 minute by circulating dry air at a temperature of 90° C. at a flow rate of 0.2 m/s.

Next, the coated substrate film was irradiated with ultraviolet light (200 mJ/cm$^2$ under a nitrogen atmosphere) to cure the transparent resin thereby forming an antiglare layer, and an antiglare film of Comparative Example 1 was obtained. The coating film thickness was 5 μm.

Example 5 and Comparative Examples 2 to 5

As illustrated in FIG. 3, the antiglare films of Example 5 and Comparative Examples 2 to 5 were produced by forming, on a substrate film, a coating layer formed from a UV curable resin having recesses and protrusions transferred to a surface by a mold.

In other words, as illustrated in FIG. 3, in Example 5 and Comparative Examples 2 to 5, the substrate film 20a, which was unwound from an unwinding roll (not illustrated) and conveyed, was inserted through a nip point of a pair of rolls 21, 22; a UV curable resin precursor was adhered to a circumferential surface of the roll 22 from a circumferential surface of a roll 23 axially supported adjacent to the roll 22, and this UV curable resin precursor was coated onto the top surface of the substrate film 20a.

The coated UV-curable resin precursor was pressed together with the substrate film 20a at the nip point N1 between the rolls (roll type mold) 21, 24. As a result, the concave-convex shape was transferred to the surface of the UV curable resin precursor when the coated UV curable resin precursor passed through the nip point N1 of the rolls 21, 24 together with the substrate film 20a.

The UV curable resin precursor, to which the concave-convex shape was transferred by the roll 24, was cured by ultraviolet light irradiated from a UV lamp provided below the rolls 21, 24, whereby a coating layer (antiglare layer) was formed. An antiglare film obtained in this manner was released from the roll 24 by a roll 25 axially supported adjacent to the roll 24, and was conveyed in a predetermined direction. A TAC (triacetyl cellulose) film was used as the substrate film.

In step (b) of fabricating a roll-shaped mold having a concave-convex shape on a surface by striking with blast particles, the value of the blast particle size was changed in a range from 10 μm to 40 μm, whereby a roll-shaped mold was fabricated. Five types of films (Example 5 and Comparative Examples 2 to 5) having different haze (Hz) values were produced according to the production method described above.

Next, the following items were measured and evaluated for each antiglare film of Examples 1 to 5 and Comparative Examples 1 to 5. The adhesive layer was omitted when measuring haze, total light transmittance, transmission image clarity, and 60 degree gloss.

Haze and Total Light Transmittance

Haze was measured in accordance with JIS K7136 using a haze meter (NDH-5000W available from Nippon Denshoku Industries Co., Ltd.). The haze was measured, with the surface having a concave-convex structure of an antiglare layer being disposed on a light receiver side.

Transmission Image Clarity

Transmission image clarity was measured using an image clarity measuring instrument (ICM-1T, available from Suga Test Instruments, Ltd.) in accordance with JIS K7105, with the antiglare film being installed such that the film production direction of an antiglare film and the direction of comb teeth of an optical comb were parallel to each other. The optical comb width was set to 0.5 mm.

60 Degree Gloss 60 degree gloss was measured at an angle of 60° using a gloss meter ("IG-320" available from Horiba. Ltd.) in accordance with JIS K7105.

Standard Deviation (Sparkle Value) of Luminance Distribution of Display

A smartphone ("Galaxy S4", available from Samsung Electronics Co., Ltd.) was used as the display device 16, and the antiglare film of each sample was affixed to the surface of the display 16a using an adhesive layer (optical glue). The standard deviation (sparkle σ: sparkle value) of the luminance distribution of the display 16a was measured through the antiglare film of each sample using the film sparkle measurement apparatus 10 available from Komatsu NTC Ltd. When the measurement was performed, at least one of the exposure time of the imaging device 12 and the luminance of all of the pixels of the display 16a was adjusted such that image data was obtained as a gray scale image with an 8-bit gradation display and an average luminance of 170 gradations.

The measurement results are shown in Table 1.

This is because, in Examples 1 and 2, it is considered that by forming the antiglare layer 3 basically with a phase separation structure, the surface shape of the antiglare layer 3 was formed to reduce a surface free energy of the antiglare layer 3 (in other words, the surface area of the antiglare layer 3 was reduced), and inclination of the recesses and protrusions of the surface of the antiglare layer 3 was suppressed. Therefore, in Examples 1 and 2, it is considered that an antiglare layer 3 was formed which is capable of suppressing sparkle of the display 16a while having favorable antiglare property without excessively increasing the haze value.

Additionally, in Examples 1 and 2, since the refractive index difference between resins combined to form the phase separation structure in the antiglare layer 3 was suppressed, it is considered that an antiglare layer 3 having excellent transmission image clarity was formed.

Moreover, each of the antiglare layers of Examples 3 and 4 had a structure in which acrylic beads were dispersed in the matrix resin, and it is considered that the refractive index difference between the matrix resin and the acrylic beads was suppressed and appropriate recesses and protrusions were formed in the surface of the antiglare layer 3 by the acrylic beads.

In addition, the antiglare layer 33 of Example 5 has a structure in which the concave-convex shape is transferred and formed on the surface by embossing; it is considered that an excessive inclination of the recesses and protrusions in the surface of the antiglare layer 33 was suppressed by forming, with blast particles having an average particle size set to a value in a range from 10 μm to 50 μma, a concave-convex shape of a mold used to transfer and form the concave-convex shape.

TABLE 1

| Items | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Haze (%) | 8.0 | 17.0 | 7 | 17 | 17.1 | 48.7 | 32.6 | 48.6 | 28.3 | 36.9 |
| Total Light Transmittance (%) | 91 | 91 | 92 | 94 | 92.9 | 92.5 | 92.9 | 92.3 | 92.4 | 91.6 |
| Transmitted Image Sharpness (%) | 83 | 93 | 91 | 80 | 93.1 | 27 | 91.2 | 63.5 | 91.3 | 81.4 |
| 60 Degree Gloss (%) | 55 | 74 | 71 | 33 | 57.5 | 65 | 49.5 | 19.5 | 45.5 | 36 |
| Sparkle σ (Standard deviation of luminance distribution) | 7.2 | 5.2 | 7.2 | 8.7 | 6.0 | 7.7 | 5.6 | 6.6 | 5.8 | 7.3 |

As shown in Table 1, for each of the antiglare films 1 of Examples 1 to 5, the transmission image clarity at an optical comb width of 0.5 mm was set to a value in a range from 80% to 94%, and the haze value of the antiglare layer 3 was set in a range from 7% to 17.1%. Additionally, for each of the antiglare films of Examples 1 to 5 and Comparative Examples 1 to 5, the sparkle value (sparkle σ) of the display 16a was suppressed to a value in a range from 5.2 to 8.7.

As shown in Table 1, the haze value of each of the antiglare layers 3 of Examples 1 to 5 was suppressed more than the haze values of Comparative Examples 1 to 5. It was found with Examples 1 to 5 that favorable antiglare property can be exhibited while suppressing both the haze value and the sparkle value of the display 16a, and that these examples had excellent transmission image clarity, and exhibited a lower degree of image degradation such as changes in color tones and blurriness of the image and characters.

Comparative Example 1 has an antiglare layer, for which suppression of sparkle of the display is intended by forming recesses and projections in the surface using high refractive index particles (polystyrene particles). However, it is considered that the use of high refractive index particles resulted in an increase in the internal haze value, leading to a higher haze value.

Each of Comparative Examples 2 to 5 has an antiglare layer in which a concave-convex shape was transferred and formed on the surface by embossing, but the average particle size of the blast particles used to form the concave-convex shape of the mold for Comparative Examples 2 to 5 was set to a value greater than the average particle size of the blast particles used to form the concave-convex shape of the mold of Example 5.

Therefore, inclination of the recesses and protrusions of the surface of each of the antiglare layers of Comparative Examples 2 to 5 was larger (sharper) than that of the recesses and protrusions in the surface of the antiglare layer of Example 5. It is considered that, as a result, Comparative Examples 2 to 5 had higher haze values (external haze values) than those of Example 5.

Note that based on the trend of characteristics in Examples 1 to 5, and an examination separately conducted by the present inventors, it is considered that the same effects as those of Examples 1 to 5 would be achieved even for a case in which the sparkle value of the display 16a is set to a value in a range from 0 to less than 5.2 and a value in a range from 8.7 or grater to 12 or less, the transmission image clarity at an optical comb width of 0.5 mm of the antiglare film 1 is set to a value in a range from 60% to less than 80% and a value in a range from 93.1% or greater to 96% or less, and the haze value of the antiglare layer 3 is set to a value in a range from 0.5% to less than 7% and a value in a range from 17.1% or greater to 20% or less.

The present invention is not limited to the embodiments described above, and changes, additions, or deletions can be made to the configurations or methods therefor without departing from the scope of the present invention. For example, the microparticles of the second embodiment may be dispersed in the antiglare layer of the first embodiment or the third embodiment.

REFERENCE SIGNS LIST

1 Antiglare film
3 Antiglare layer
16a Display

The invention claimed is:

1. An antiglare film comprising an antiglare layer having a haze value set in a range from 7% to 20%, wherein the antiglare layer comprises a matrix resin and a plurality of microparticles dispersed in the matrix resin,
   transmission image clarity at an optical comb width of 0.5 mm being a value in a range from 80% to 96%, 60 degree gloss being a value in a range from 33% to 74%, and, in a state where the antiglare film is mounted on a surface of a display, a standard deviation of luminance distribution of the display being a value in a range from 0 to 12.

2. The antiglare film according to claim 1, wherein a refractive index difference between the microparticles and the matrix resin is a value in a range from 0 to 0.20.

3. The antiglare film according to claim 2, wherein a ratio G2/G1 of a weight G1 of the matrix resin of the antiglare layer to a total weight G2 of the plurality of microparticles included in the antiglare layer is a value a range from 0.02 to 0.15.

4. An antiglare film comprising an antiglare layer having a haze value set in a range from 7% to 20%, wherein the antiglare layer comprises a matrix resin and a plurality of microparticles dispersed in the matrix resin,
   transmission image clarity at an optical comb width of 0.5 mm being a value in a range from 60% to 96%, a 60 degree gloss being a value in a range from 33% to 74%, and, in a state where the antiglare film is mounted on a surface of a display, a standard deviation of luminance distribution of the display being a value in a range from 0 to 12; and
   wherein the antiglare layer further comprises a plurality of resin components and has a co-continuous phase structure formed by phase separation of the plurality of resin components.

* * * * *